US005570898A

United States Patent [19]
Albert

[11] Patent Number: 5,570,898
[45] Date of Patent: Nov. 5, 1996

[54] FOLDING TRAILER

[75] Inventor: Michael Albert, Bradenton, Fla.

[73] Assignee: Myco Trailers, Inc, Bradenton, Fla.

[21] Appl. No.: 390,497

[22] Filed: Feb. 17, 1995

[51] Int. Cl.⁶ .................................................. B62B 1/00
[52] U.S. Cl. ........................ 280/656; 280/789; 280/639; 414/537
[58] Field of Search ................................. 280/656, 789, 280/401, 415.1, 47.2, 639, 47.18; 414/537

[56] References Cited

U.S. PATENT DOCUMENTS

| | | | |
|---|---|---|---|
| 3,010,734 | 11/1961 | Clark | 280/116 |
| 4,239,258 | 12/1980 | Burris | 280/639 |
| 4,362,316 | 12/1982 | Wright | 280/656 |
| 4,372,568 | 2/1983 | Campbell | 280/63 |
| 4,415,181 | 11/1983 | McCall et al. | 280/700 |
| 4,480,851 | 11/1984 | St-Pierre | 280/656 |
| 4,529,220 | 7/1985 | Wright et al. | 280/656 |
| 4,763,914 | 8/1988 | Lemmons | 280/401 |
| 4,768,806 | 9/1988 | Tétreault | 280/656 |
| 4,786,073 | 11/1988 | Harper | 280/656 |
| 4,966,386 | 10/1990 | Werdich | 280/700 |
| 5,228,712 | 7/1993 | Speier | 280/401 |

*Primary Examiner*—Kenneth R. Rice
*Attorney, Agent, or Firm*—C. Douglas McDonald, Jr. & Associates. P.A.

[57] ABSTRACT

A folding trailer is disclosed for carrying a motorcycle including a front deck with a rear edge extending generally transversely of the trailer, a rear deck with a front edge extending generally transversely of the trailer and generally parallel to the front deck rear edge, hinge means including a pivot axis connecting the front deck to the rear deck so that the trailer folds around the pivot axis between an extended position in which the front and rear decks are generally co-extensive and a folded position in which the front and rear decks are positioned generally facing one another, an axle mounted generally transversely of the trailer to the rear deck rearwardly of the hinge means including a first and a second end, and a road wheel attached to the axle first end and a road wheel attached to the axle second end, so that the trailer is designed to move generally normal to the axle.

13 Claims, 8 Drawing Sheets

FOLDING TRAILER

FIELD OF THE INVENTION

This invention relates to a folding trailer for towing behind a vehicle.

BACKGROUND OF THE INVENTION

Trailers for towing behind vehicles offer well known advantages for hauling various loads but require significant amounts of storage when not in use. For this reason, folding trailers have been developed. Existing folding trailer designs have significant disadvantages, including inconvenient and difficult storage and movement when folded, paint abrasion at points of engagement between the folded parts, contact of the fenders of the trailer with the ground during folding, and lack of a built-in ramp for more convenient loading.

SUMMARY OF THE INVENTION

In view of the foregoing it is the object of the present invention to provide an economical apparatus for a folding trailer.

To achieve these and other objects that will become readily apparent to those skilled in the art, this invention provides a folding trailer, such as for carrying a motorcycle, including a front deck with a rear edge extending generally transversely of the trailer, a rear deck with a front edge extending generally transversely of the trailer and generally parallel to the front deck rear edge, hinge means including a pivot axis connecting the front deck to the rear deck so that the trailer folds around the pivot axis between an extended position in which the front and rear decks are generally co-extensive and a folded position in which the front and rear decks are positioned generally facing one another, an axle mounted generally transversely of the trailer to the rear deck rearwardly of the hinge means including a first and a second end, and a road wheel attached to the axle first end and a road wheel attached to the axle second end, so that the trailer is designed to move generally normal to the axle.

BRIEF DESCRIPTION OF THE DRAWINGS

Particularly preferred embodiments of the method and apparatus of this invention will be described in detail below in connection with the drawings in which.

DESCRIPTION OF PREFERRED EMBODIMENT

Figure 1:
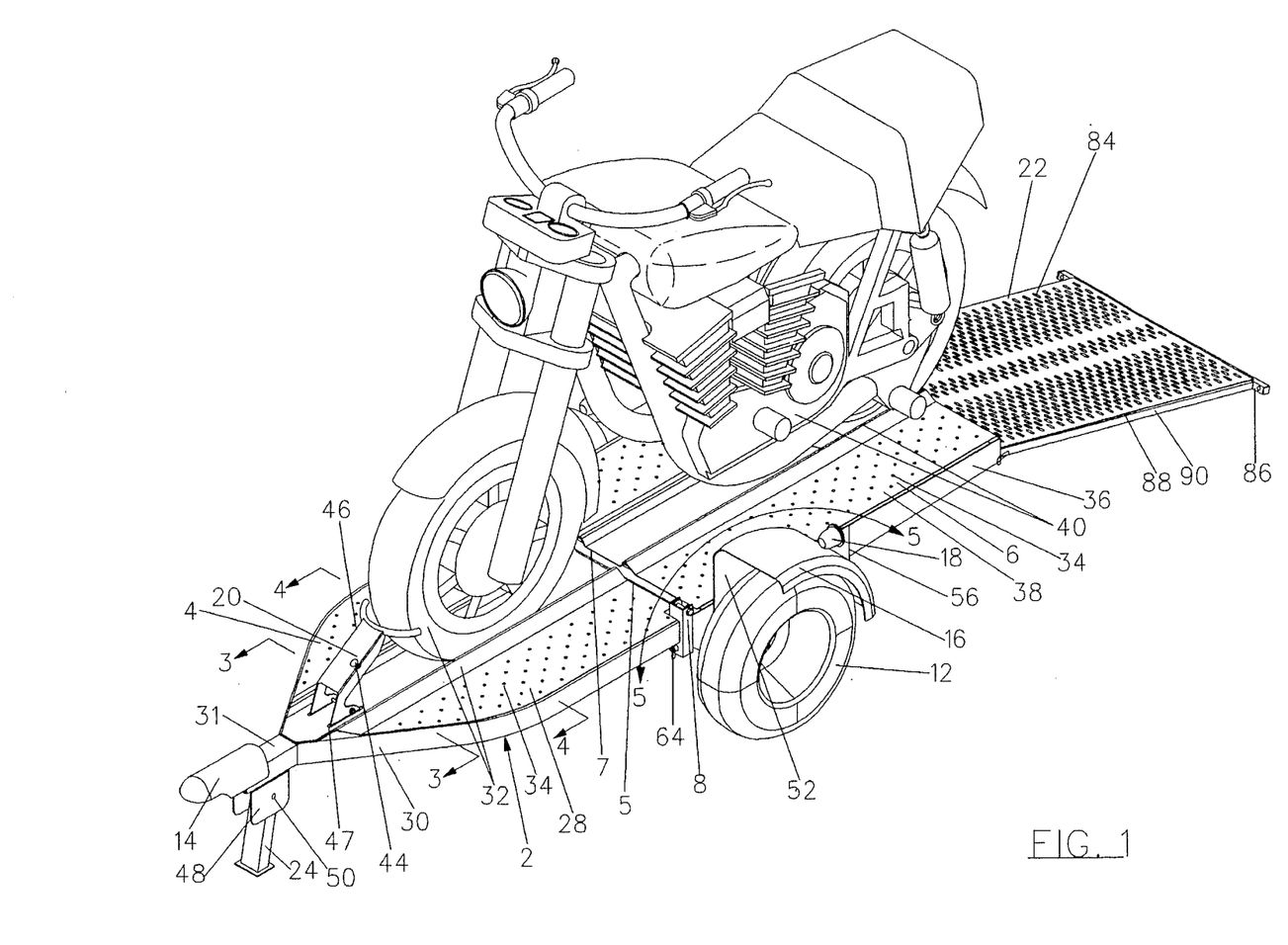
FIG. 1 is a perspective view of a folding trailer according to the present invention, loaded with a motorcycle shown in phantom.

Preferred embodiments of the apparatus of this invention are illustrated in FIGS. 1 through 9. FIG. 1 is a perspective view of a folding trailer, generally indicated as 2.

In a preferred embodiment, the major structural components of folding trailer 2 are a front deck 4 connected at its rear edge 5 to a rear deck 6 at the front edge 7 thereof by folding means or hinge means 8. In a preferred embodiment an axle 10, shown in FIG. 6, a fragmentary sectional view taken from below along line 5—5 of FIG. 1, is attached to the rear deck 6 generally transversely of trailer 2 and rearwardly of hinge means 8 and has a first end and a second end to which road wheels 12 are attached. Trailer 2 is designed to move generally normal to the axle 10.

When extended, as shown in FIG. 1, the trailer 2 is designed to be towed behind a vehicle. For this preferred use, an attachment 14 for use with a towing ball is provided. When being towed, debris and spray picked up by the wheels 12 from a road surface may conveniently be trapped by fenders 16, which include brake lights 18 for safety and compliance with traffic laws. The trailer 2 may be towed behind a vehicle while carrying a load that may conveniently be a motorcycle. In this case, the front wheel of the motorcycle is held by a motorcycle wheel engaging bracket 46, which also ensures correct positioning of the motorcycle.

For convenient loading when unfolded, ramp 22 is mounted to rear deck 6 for generally telescoping movement between a retracted position beneath and generally parallel to the rear deck 6 and an extended position extending between the rear deck 6 and the ground on which trailer 2 rests. While in this parked position, a folding front support 24 is extended to engage the ground for longitudinal stability.

Figure 2:
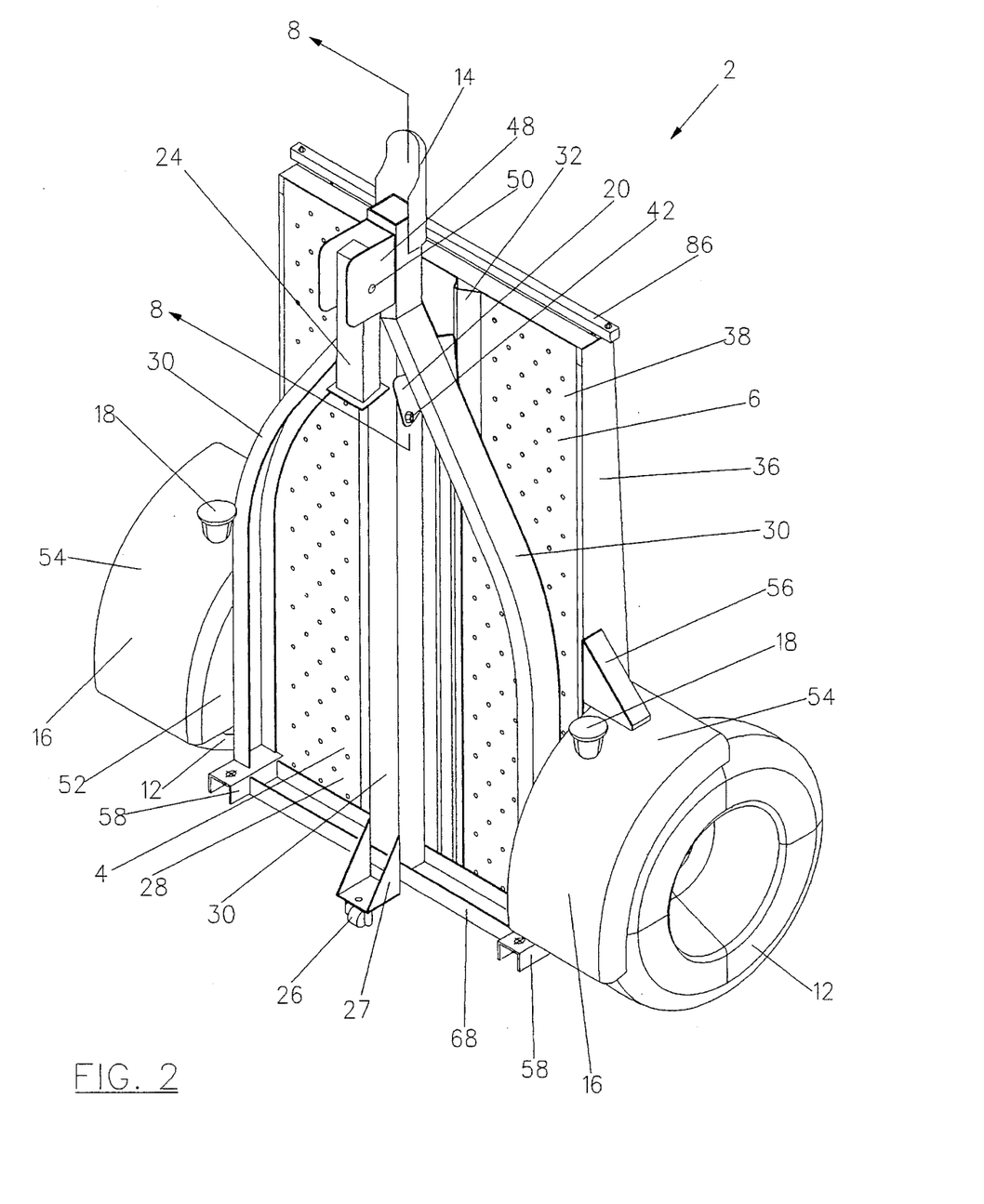
FIG. 2 is a perspective view of the trailer of FIG. 1 in a folded position.

A particular advantage of the present invention is its convenient storage, illustrated in FIG. 2, a perspective view of the trailer of FIG. 1 in a folded position. For this purpose, trailer 2 of this preferred embodiment may be folded about hinges 8 to produce a configuration that requires less storage space than existing designs when pivoted about axle 10 to an upright position in which the front deck 4 and the rear deck 6 extend in a generally upwardly direction. Particular advantages of this preferred embodiment include that the road wheels 12 engage the floor or ground and that the folding trailer 2 rests upon the wheels 12 when in an upright position. For balance and stability, rolling support means 26 is attached to the front deck 4 proximal to its rear edge 5 by a mounting bracket 27. When upright, trailer 2 also rests upon rolling support means 26. Rolling support means 26 may conveniently comprise a caster or a fixed roller, but may also be a solid member extending to the ground, in which case the folding trailer 2 would be tipped slightly to permit its movement when in a folded or upright position. Placement of the rolling support means 26 need not be along the center line of the front deck 4, but may be placed in any position such that it engages the ground when the trailer 2 is folded. In a preferred embodiment in which the wheels 12 are not aligned with the center of gravity of the trailer 2 when the trailer 2 is in a folded position, the support means 26 may optimally be on the opposite side of the center of gravity of the trailer 2 from the wheels 12.

Figure 3:
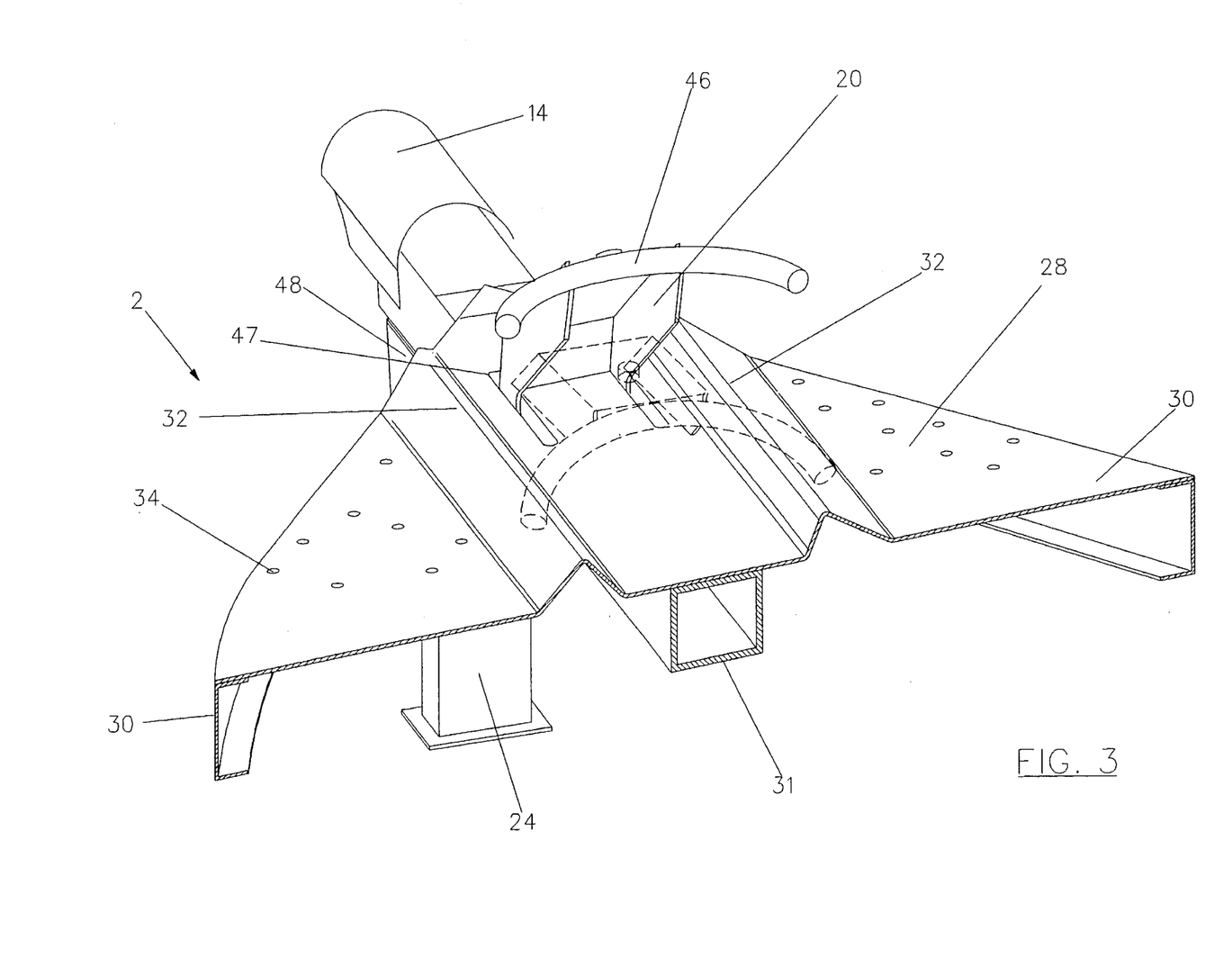
FIG. 3 is a sectional perspective view of the trailer of FIG. 1 taken along line 3—3 of FIG. 1 and showing the motorcycle wheel engaging bracket in its extended position and in its retracted position in phantom.

FIG. 3 is a partial perspective view of a folding trailer taken along line 3—3 of FIG. 1. FIG. 3 clarifies the construction of a preferred embodiment of the present invention, in which front deck 4 comprises a front deck plate 28, two longitudinal frame members 30 extending generally longitudinally adjacent the edges of the front deck plate 28, and a central frame member 31 arranged longitudinally along the center of the bottom of the front deck plate 28. The rear edge 5 of the front deck 4 extends generally transversely of the trailer 2. As shown in FIG. 3, the front deck plate 28 may conveniently be provided with raised ridges 32 running longitudinally and generally parallel to each other along the front deck plate 28. These raised ridges 32, in this preferred embodiment, may conveniently be used as a track to guide the wheels of a motorcycle that is being loaded onto the trailer or unloaded therefrom. To prevent slipping and allow rain drainage, areas of the front deck plate 28 outside the track defined by the raised ridges 32 may have protrusions or apertures 34 punched thereinto. Although a preferred embodiment of the front deck plate 28 involves the use of sheet steel, any other material having the required resilience and durability may be used, including certain plastics, other metals and alloys, and also combinations thereof and including other materials such as wood and durable textiles. A front cross member 68 extends along the rear edges between the front longitudinal frame members 30.

The rear deck 6 is constructed similarly, as seen in FIG. 1, including rear longitudinal frame members 36, a rear deck plate or support member 38 attached to longitudinal frame members 36 at its lateral edges, and rear raised ridges 40 formed as described earlier for the front raised ridges 32. The front edge 7 of the rear deck 6 extends generally transversely of the trailer 2, and generally parallel to the rear edge 5 of the front deck 4. In this preferred embodiment, the rear deck plate 38 may also have protrusions or apertures 34 formed therethrough, although the area between rear raised ridges 40 may be left free of such protrusions or apertures. A rear cross member 70 extends along the front edge 7 between the rear longitudinal frame members 36.

Figure 4:
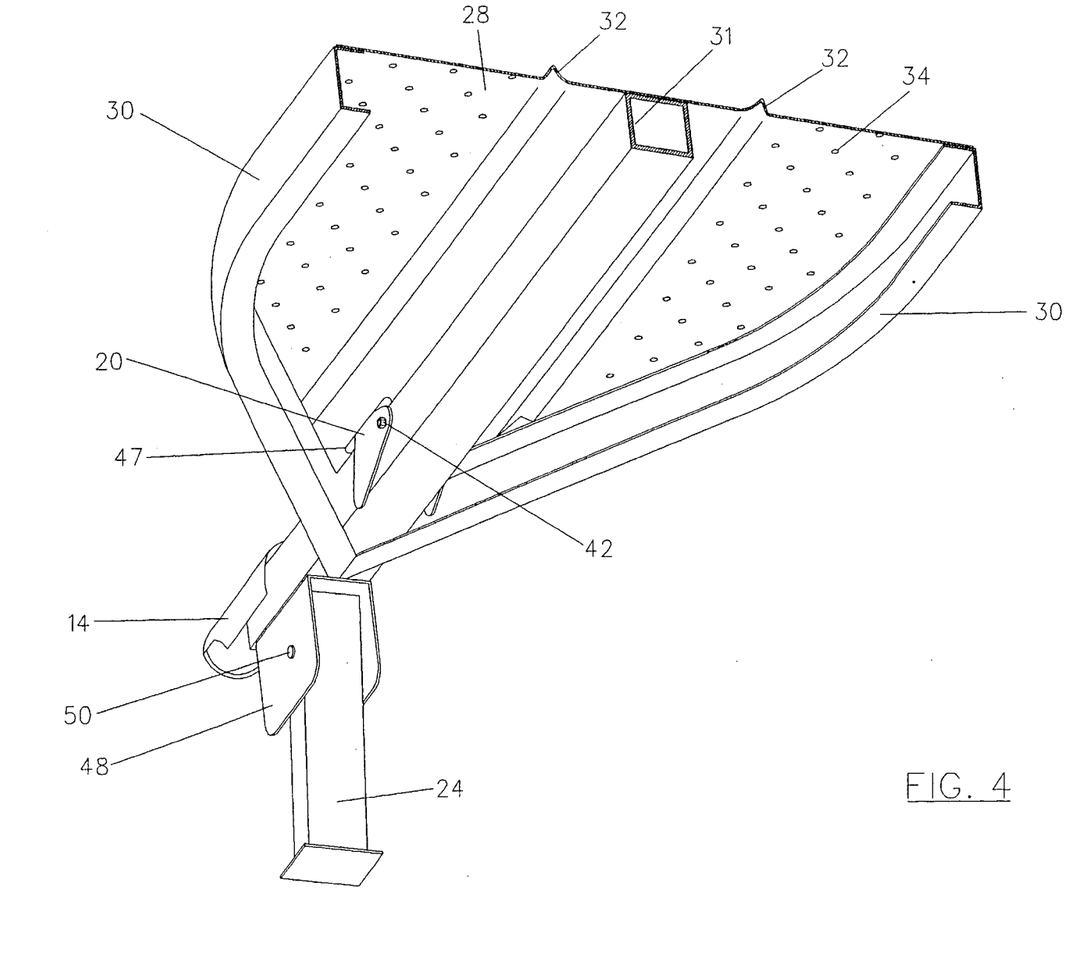
FIG. 4 is a sectional perspective view of the trailer of FIG. 1 taken from below and along line 4—4 of FIG. 1.
Figure 9:
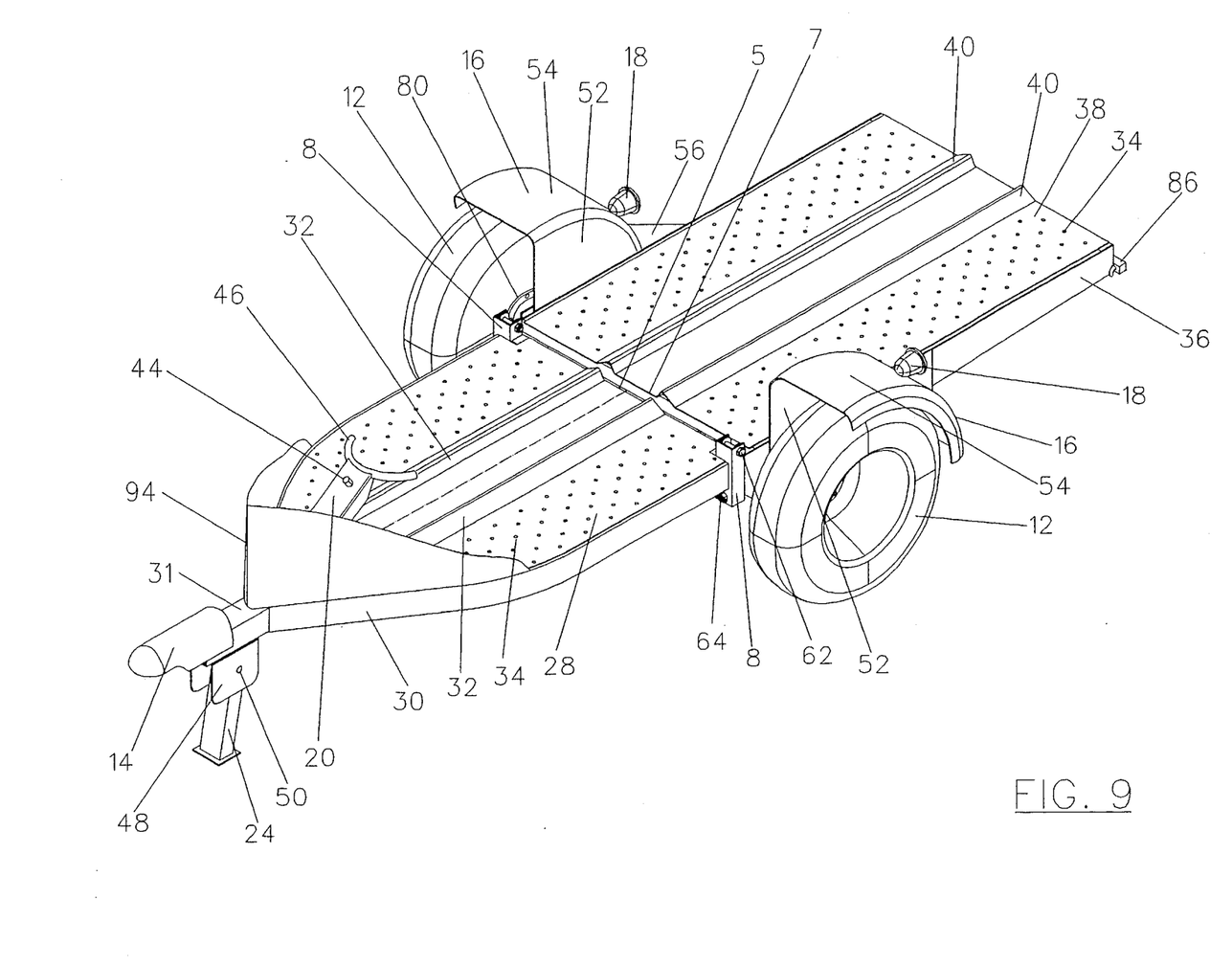
FIG. 9 is a perspective view of another embodiment of the trailer of this invention, showing a fairing attached to the trailer.

As seen in FIG. 3 and in FIG. 4, a partial perspective view of the trailer of FIG. 3 from below, the motorcycle wheel engaging bracket 46 is attached to an arm 20, having a resilient synthetic resin or rubber bumper 44 attached to its upper surface. Arm 20 extends from the front deck 4 and passes through the front deck plate 28 and is pivotally mounted to front deck 4 about a bolt 42 passing through the front central member 31. When in an extended position, motorcycle wheel engaging bracket 46 and arm 20 are pivoted upwardly from front deck 4, and held extended above the front deck 4 by tension on bolt 42. In this position, the wheel-contoured motorcycle wheel engaging bracket 46 attached to the arm 20 is elevated from the front deck plate 28 to engage the front wheel of a motorcycle, as shown in FIG. 1. The arm 20 is mounted to be moved between the extended position, shown in the solid line representation in FIG. 3, and a retracted position, shown in phantom in FIG. 3, in which the arm 20 pivots downwardly in slots 47 to be positioned adjacent the front deck 4. In this retracted position, the arm 20 and motorcycle engaging bracket 46 serve an additional purpose of being interposed between the surface of front deck 4 and the upper surface of rear deck 6 when the trailer 2 is in its folded position, as seen in FIG. 9, a fragmentary side view of the motorcycle engaging bracket 46 interposed between the front deck 4 and the rear deck 6, taken along line 9—9 of FIG. 2. The ends of the front deck 4 and rear deck 6 distal from the hinge means 8 and in a region proximal the motorcycle wheel engaging bracket 46 are thereby prevented from contacting each other, which might otherwise result in wear and damage to a surface of paint that may conveniently be applied to the trailer 2 to protect it from the elements.

The folding front support 24 is attached to the front central member 31 by a bracket 48 attached to the central member 31 by well known commercial means such as bolts or welding. To permit the folding front support 24 to fold, a bolt 50 attaches the folding front support 24 to the bracket 48. The folding front support 24 pivots about bolt 50 and has a position of extension when the trailer 2 is to be in a resting position, and a position of use, or retraction, when the trailer 2 is being towed, or when it is folded for storage.

Referring to FIGS. 1 and 2, fenders 16 are attached to the rear deck 6 and spaced about each road wheel 12. An inner plate 52 is bolted to the rear longitudinal frame member 36 adjacent to the wheel 12 being covered by the fender 16. This inner plate 52 may conveniently be about a quarter circle in shape. About the outside of this inner plate 52 and spaced from and extending about the perimeter of the road wheel 12 from a point generally adjacent the rear deck 6 to a point generally above the uppermost portion of the road wheel 12, a curved panel 54 is attached by welding, bolting, or other conventional means, to which curved plate 54 brake lights 18 are attached. For stability and security, fenders 16 may conveniently be further attached to the rear longitudinal frame members 36 by triangular supports 56, which are attached to the longitudinal frame members 36 and the curved plates 54 by bolting or other conventional means.

Figures 5, 7:
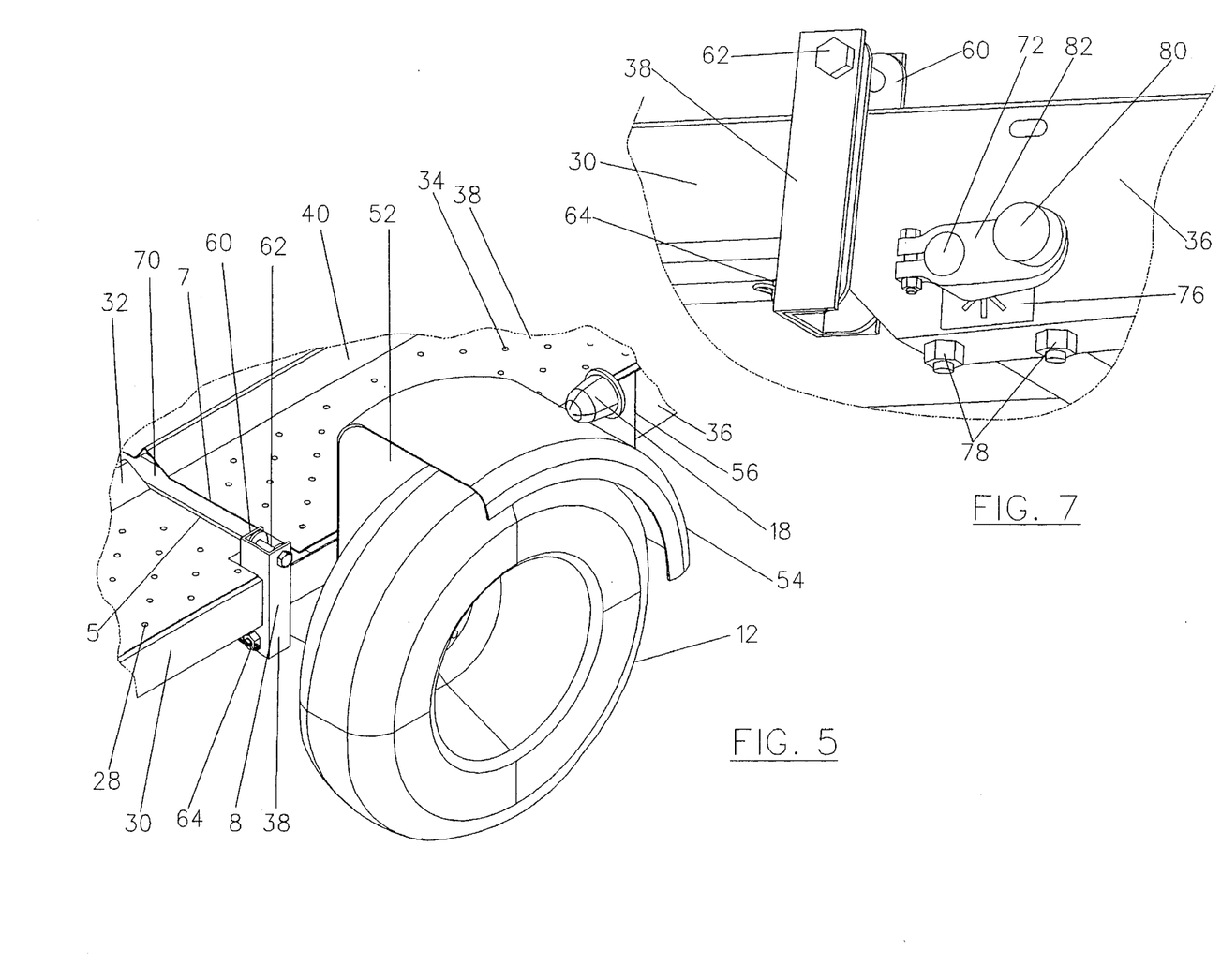
FIG. 5 is a fragmentary perspective view taken along line 5—5 of FIG. 1 showing a wheel and a hinge.
FIG. 7 is a fragmentary perspective view of the trailer of FIG. 5 with the wheel and fender removed taken from a rear perspective.
Figure 6:
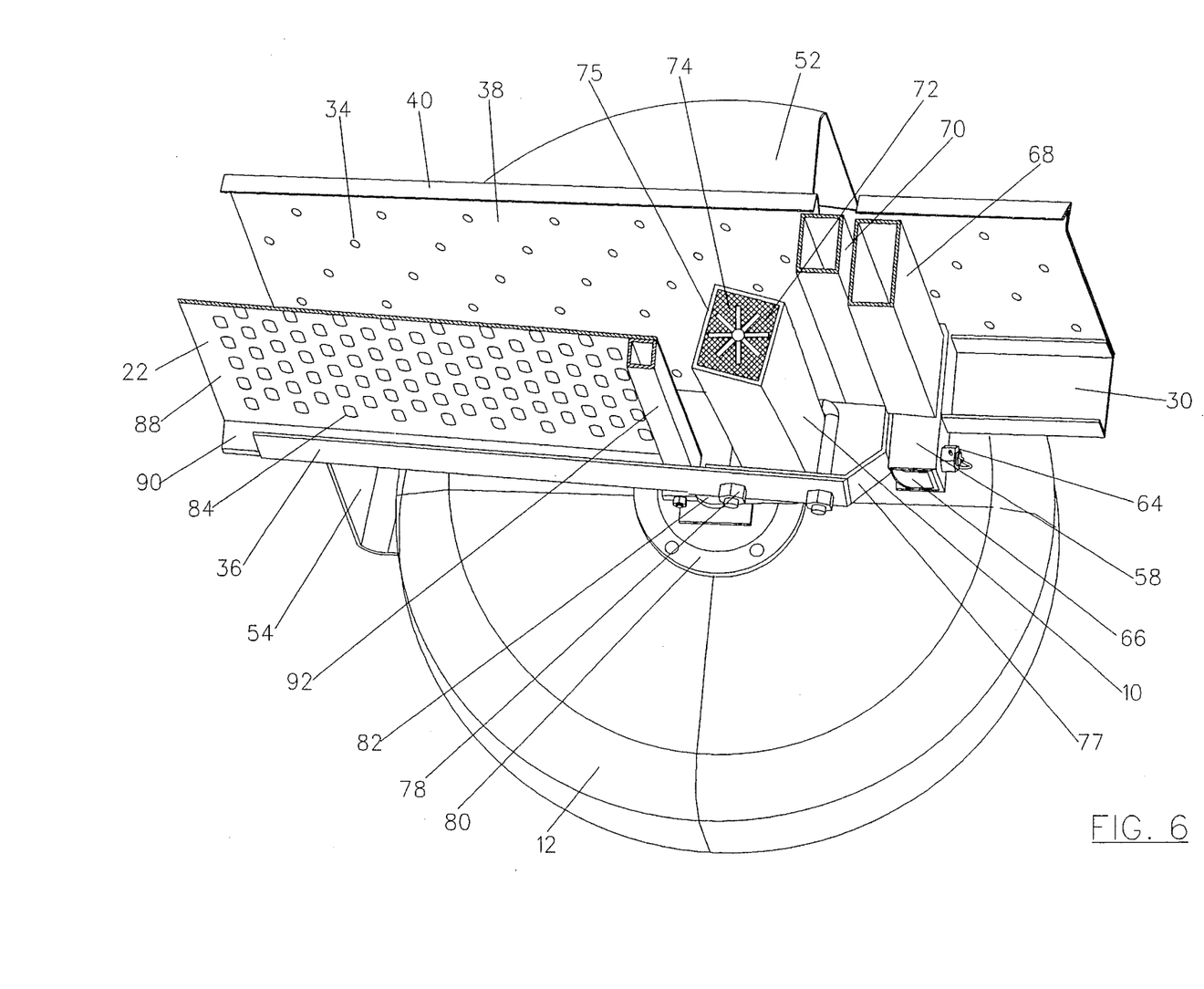
FIG. 6 is a fragmentary perspective view of the trailer of FIG. 5, from below.
Figure 8:
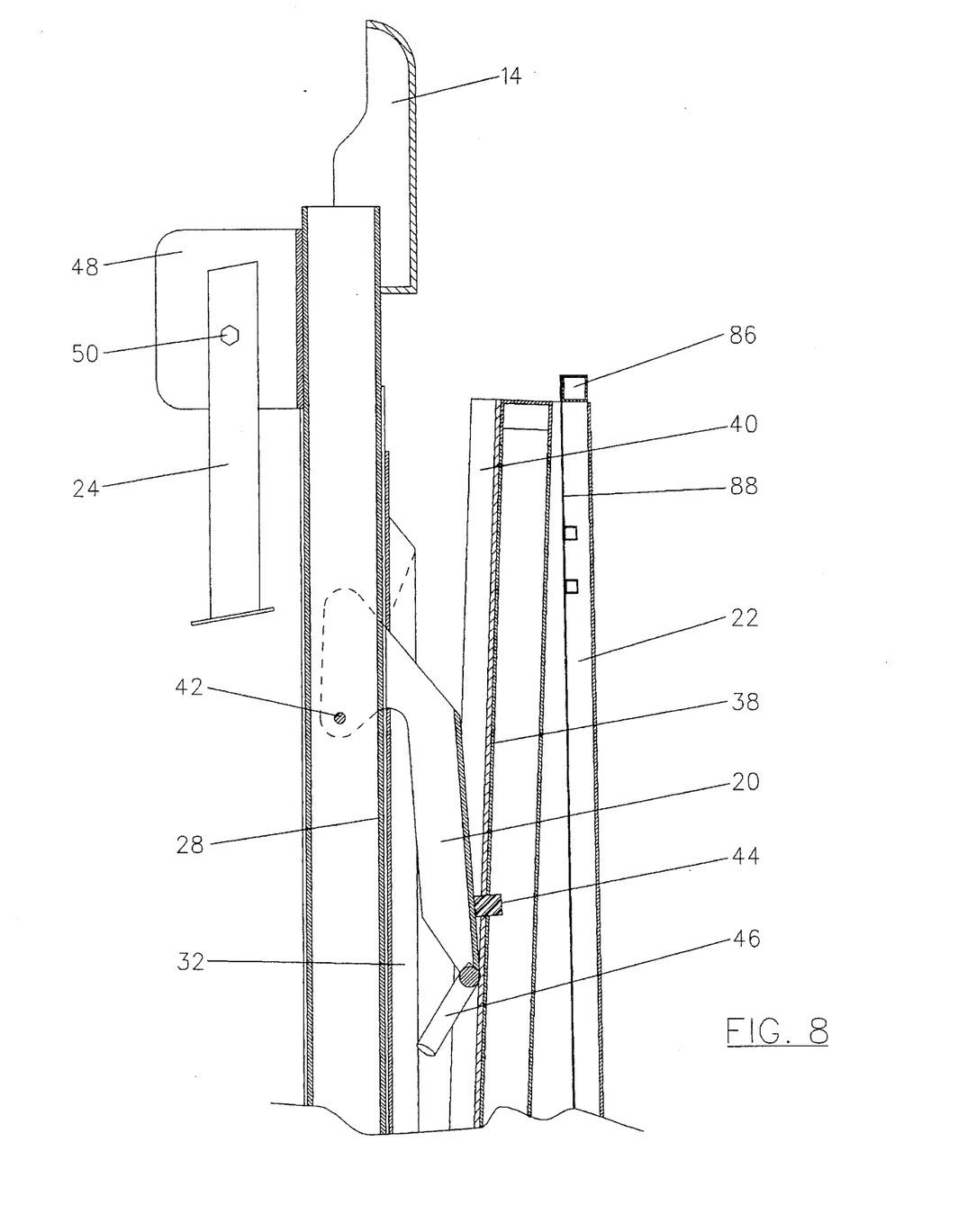
FIG. 8 is a fragmentary side view of the motorcycle wheel engaging bracket interposed between the front and the rear deck, taken along line 8—8 of FIG. 2.

FIG. 5 is a fragmentary perspective view taken along line 5—5 of FIG. 1 showing the wheel 12. FIG. 6 is a fragmentary perspective view of the trailer of FIG. 5 taken from below, showing greater detail of the axle 10 and the underside of the rear deck 6. FIG. 7 is a fragmentary perspective view of the trailer of FIG. 5 with the wheel 12 removed, taken from a different angle. As seen in FIGS. 5, 6, and 7, hinges 8 comprise a front hinge bracket or front portion 58 connected to the front deck 4 into which the rear lateral member 36 fits. Two brackets 60 comprise a rear portion of hinge 8 connected to the rear deck 6 and extend above the rear longitudinal frame member 36, so that a bolt 62 or pivot may pass through both the front hinge bracket 58 and the brackets 60. This pivot 62 defines and is collinear with an axis of rotation or pivot axis parallel to and positioned above the upwardly facing surfaces of the front deck 4 and rear deck 6 when the trailer 2 is in the extended position. Because the pivot axis of hinge 8 is positioned above the plane of the decks, the front deck 4 will be spaced apart from the rear deck 6 in a region proximal to the hinges 8 when the trailer is in the folded position as shown in FIG. 2. In addition, hinge 8 is pivotally moveable only between an extended position in which the front deck 4 and the rear deck 6 are generally coextensive and, in this embodiment, generally define a continuous plane, and a folded position in which the trailer 2 is folded, and the front deck 4 and rear deck 6 are positioned generally facing one another. When the trailer 2 is unfolded, or extended, and the hinges 8 are in their fully unfolded position, means 64 for securing the hinges 8 are used to prevent pivoting movement of the hinge 8 and therefore to prevent the trailer 2 from folding while in use. Securing means 64, most clearly seen in FIG. 6, may conveniently comprise a wing, slotted, or cassellated nut threaded onto a bolt passing through lower flap 66 extending from the rear lateral member 36, and through the front hinge bracket 58, thus locking the end of the hinge 8 farthest from the pivot bolt 62 to prevent the hinge 8 from opening. In this preferred embodiment a nut 64 is used with a horizontal hole drilled through it and through the bolt for passage of a metal clip capable of holding itself in the hole, as depicted. Even without securing means 64 hinges 8 will not open under a load such as a motorcycle having a front wheel engaging front deck 4 and a rear wheel engaging rear deck 6, because the trailer 2 is dimensioned such that the rear wheel and front wheel press down on opposite sides of axle 10, in a direction in which the hinges 8 cannot fold. This applies a moment to the hinges 8 in a direction to urge the trailer 2 to its extended position, so that the trailer 2 resists folding when a motorcycle is supported.

The axle 10, in this preferred embodiment, may conveniently be a torsion axle comprising a metal splined shaft 72 having a central axis and running longitudinally through and being received within a solid mass of elastically resilient synthetic resin 74, which, in turn is received within an elongated housing 75, which is rigidly affixed to the rear deck 6. This preferred embodiment of the axle 10 will damp and elastically resist rotation of the splined shaft 72, which will result in shock absorption and suspension of the trailer 2, as will be discussed below. As seen in FIG. 7, axle 10 passes through openings 76 in the rear longitudinal frame members 36, which openings may conveniently be shaped to engage the axle housing 75 with that housing 75 being affixed by conventional means to the frame members 36 to prevent dislocation of the axle 10 during use of the trailer 2. Although openings 76 are described as being formed through the lateral members 36, rear deck 38 could equally suitably be folded at its edge downwardly for greater stability, if not ease of manufacture. To assist in retaining axle 10 in position during use of the trailer 2, a u-shaped bolt 78 is fastened to each of the rear lateral members 36, holding within its curve the axle housing 75. In a preferred embodiment, bracket 77 is welded to longitudinal frame member 36 for additional strength near hinge 8 and lower flap 66.

As seen in FIG. 7, a wheel 12 is removably attached to a hub or rotatable wheel carrier 80 that is attached to each end of the axle 10. The hub 80 is any well known rotational device such as a ball bearing hub and is mounted to a moment arm 82 extending rearwardly of the trailer 2 from a point of engagement with the splined shaft 72 on the outside of the rear frame member 36. In this preferred embodiment, when an obstacle or change in load is encountered and results in upward displacement of either road wheel 12, torque is applied to the torsion axle 10 by a rotational movement of the moment arm 82 about the shaft 72. Torsional force is applied by the splined shaft to the solid mass of synthetic resin 74 for elastically resilient resistance. The solid mass of synthetic resin 74 resists movement of the splines 72 and provides for an elastic and compact suspension. In this preferred embodiment, housing 75 may conveniently have a generally rectangular cross sectional configuration and may be mounted to the rear deck 6 at a location beneath the motorcycle supporting surface 38.

The ramp 22, seen in a position of extension in FIG. 1 and in a position of retraction in FIG. 6, is mounted to the rear deck 6 for generally telescoping movement between a retracted position beneath and generally parallel to the rear deck 6 and an extended position extending the rear of the rear deck 6 and the ground on which the trailer 2 rests.

For grip when climbing the ramp 22, holes 84 may be formed in the ramp 22, deforming the surface of the ramp 22 upwardly in areas immediately adjacent the holes. In this preferred embodiment, the rear end of the ramp 22 has an end member 86 extending beyond the lateral edges of the ramp 22. This end member 86 stiffens the ramp 22 and prevents it from being inserted too far into the rear deck 6. When in a retracted position, ramp 22 may conveniently rest upon flanges extending inwardly from the rear longitudinal frame member 36, as shown in FIG. 6. While any durable material for construction of the ramp 22 may be used for this invention, a preferred embodiment involves a panel 88 of steel with lateral support flanges 90 and a front member 92 likewise attached to the ramp panel 88.

As seen in FIG. 9, a perspective view of another embodiment of the trailer 2 of FIG. 1, a fairing 94 may be attached to the front portion of the trailer. Because of similarities between embodiments, the same reference numbers shall be used to indicate the same parts of this embodiment for convenience and clarity when referring to parts other than the fairing 94. The fairing 94 may conveniently comprise a curved sheet of metal that may produce aerodynamic improvement in the performance of the trailer 2 and may also protect a motorcycle being carried on the trailer 2 from stones and other encountered road debris. In this preferred embodiment, the fairing 94 extends generally upwardly from the front deck 4 and attaches to the front longitudinal frame members 31 by conventional means, such as by welding or by bolts or rivets.

While the foregoing describes in detail several preferred embodiments of the trailer of this invention, it is to be understood that such description is illustrative only of the principles of the invention and is not to be considered limitative thereof. Because numerous variations and modifications of the trailer will readily occur to those skilled in the art, the scope of this invention is to be limited solely by the claims appended hereto.

What is claimed is:

1. A folding trailer for carrying a motorcycle, said trailer comprising a front deck having a rear edge thereof extending generally transversely of said trailer;

a rear deck having a front edge thereof extending generally transversely of said trailer and generally parallel to said front deck rear edge;

hinge means including a single pivot axis and connecting said front deck to said rear deck, such that said trailer folds around said single pivot axis between an extended position in which a defined upwardly facing surface of said front deck and a defined upwardly facing surface of said rear deck are generally coextensive, and a folded position in which said defined upwardly facing surface of said front deck and said defined upwardly facing surface of said rear deck are positioned generally facing toward one another;

an axle attached to said rear deck and comprising a first end and a second end, said axle being mounted generally transversely of said trailer and rearwardly of said hinge means; and a first road wheel attached to said axle first end and a second road wheel attached to said axle second end, such that the trailer is designed to move generally normal to said axle.

2. The folding trailer of claim 1 wherein said axle is mounted to said trailer such that said trailer, in said folded position, may be pivoted about said axle to an upright position such that said front deck and said rear deck extend in a generally upwardly direction, said trailer further comprising rolling support means attached to said front deck proximal said rear edge thereof, such that said trailer, when folded and in said upright position, rests upon said road wheels and said rolling support means.

3. The folding trailer of claim 2 further comprising fenders connected to said rear deck and spaced about each of said road wheels, said fenders being spaced from and extending about the perimeter of each said road wheel from a point generally adjacent said rear deck to point a generally above the uppermost portion of said wheel when said trailer is in said extended position, whereby the fenders do not scrape the ground when the trailer is in the folded and upright position.

4. The folding trailer of claim 2 wherein said hinge means comprises a plurality of hinges, each said hinge comprising a front portion connected to said front deck and a rear portion connected to said rear deck, with said hinge front portion being joined to said hinge rear portion by a pivot collinear with said hinge means pivot axis and positioned above the surfaces of said front deck and said rear deck when said trailer is in said extended position, with each said hinge being pivotally moveable between said extended position and said folded position of said trailer, said hinge pivot being positioned such that, when said trailer is in said folded position, said front deck is spaced apart from said rear deck in a region proximal to said hinges.

5. The folding trailer of claim 4 wherein each said hinge further includes means for securing said hinge in said extended position, whereby pivoting movement of the hinge is prevented when so secured.

6. The folding trailer of claim 4 further comprising a motorcycle supported thereupon and having a front wheel and a rear wheel engaging said trailer when said trailer is in said extended position, said trailer being dimensioned such that said front wheel of said supported motorcycle engages said front deck; and said rear wheel of said supported motorcycle engages said rear deck behind said axle, such that the weight of said motorcycle applies a moment to said hinges in a direction to urge said trailer toward said extended position, whereby the trailer resists folding when the motorcycle is supported.

7. The folding trailer of claim 4 further comprising a motorcycle wheel engaging bracket mounted to an arm extending from said front deck, said arm being pivotally mounted to said front deck for movement between a retracted position with said motorcycle wheel engaging bracket positioned adjacent said front deck, and an extended position with said arm pivoted away from said front deck.

8. The folding trailer of claim 7 wherein said motorcycle wheel engaging bracket in said retracted position is interposed between said surface of said front deck and said upper surface of said rear deck when said trailer is in said folded position, such that said motorcycle wheel engaging bracket serves to prevent contact between said rear deck and said front deck in a region proximal to said motorcycle wheel engaging bracket.

9. The folding trailer of claim 1 wherein said axle comprises, at each opposed end thereof, a rotatable wheel carrier mounted to a first end of a moment arm, the second end of said moment arm being mounted to a splined shaft having a central axis, said splined shaft being received within a solid mass of elastically resilient synthetic resin affixed to said rear deck, such that upward displacement of either said road wheel will tend to rotate its respective said moment arm about said shaft central axis, thereby imparting torsional force by said splined shaft to said solid mass of synthetic resin for elastically resilient resistance thereby.

10. The folding trailer of claim 9 wherein said axle further comprises an elongated housing enclosing said mass of resilient synthetic resin, said housing having a generally rectangular cross sectional configuration and being mounted to said rear deck at a location beneath the motorcycle supporting surface thereof.

11. The folding trailer of claim 10 wherein said rear deck comprises a motorcycle supporting member having opposed longitudinally extending lateral edges and being mounted to a respective frame member extending longitudinally adjacent each said supporting member lateral edge; and said axle housing extends through each said longitudinally extending rear deck frame member.

12. The folding trailer of claim 1 further comprising a fairing attached to an edge of said front deck extending in a direction generally upwardly from said front deck, whereby debris encountered by said folding trailer during motion is deflected by said fairing.

13. The folding trailer of claim 1 further comprising a ramp mounted to said rear deck for generally telescoping movement between a retracted position beneath and generally parallel to said rear deck and an extended position extending between the rear of said rear deck and the ground on which said trailer rests.

* * * * *